(12) United States Patent
Lucas et al.

(10) Patent No.: US 7,766,984 B2
(45) Date of Patent: Aug. 3, 2010

(54) METHOD OF INCREASING CARBON FOAM YIELD

(75) Inventors: Rick D. Lucas, St. Clairsville, OH (US);
Thomas M. Matviya, McKees Rocks, PA (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 1387 days.

(21) Appl. No.: 11/082,342

(22) Filed: Mar. 17, 2005

(65) Prior Publication Data
US 2005/0204613 A1   Sep. 22, 2005

Related U.S. Application Data

(60) Provisional application No. 60/553,560, filed on Mar. 17, 2004.

(51) Int. Cl.
*C10L 5/00* (2006.01)
*C01B 31/00* (2006.01)

(52) U.S. Cl. .................................. 44/620; 423/445 R
(58) Field of Classification Search ............ 44/620; 423/445 R
See application file for complete search history.

(56) References Cited

FOREIGN PATENT DOCUMENTS

JP            61270205 A  * 11/1986

* cited by examiner

*Primary Examiner*—Cephia D Toomer
(74) *Attorney, Agent, or Firm*—Philip D. Lane

(57) ABSTRACT

A method for increasing the yield of carbon foam is described. The method includes placing a foaming sheet over the top surface of the material to be foamed. In certain embodiments, the foaming sheet is placed over the top surface of particulate coal prior to and during the foaming process. In some embodiments the foaming sheet is a smooth, continuous sheet, such as aluminum foil or the like. The resulting carbon product includes an increased amount of usable carbon foam.

10 Claims, 2 Drawing Sheets

METHOD OF INCREASING CARBON FOAM YIELD

CROSS-REFERENCE TO RELATED APPLICATIONS

This application claims priority to U.S. Provisional Patent Application No. 60/553,560, filed Mar. 17, 2004, which is herein specifically incorporated by reference in its entirety.

This invention was made with Government support under contract number F29601-03-C-0078 awarded by the Air Force Research Laboratory—Kirtland. The Government has certain rights in the invention.

FIELD OF THE INVENTION

The invention relates to the production of carbon foam and in particular increasing the yield of carbon foam produced during foaming procedures.

SUMMARY OF THE INVENTION

The present invention is directed to the use of a foaming sheet during foaming procedures to increase the amount of carbon foam produced in the resultant product. The foaming sheet is placed of the top surface of the carbon material to be foamed and allowed to remain on the top surface during foaming procedures. The foaming sheet must be able to withstand the conditions of the foaming process and in some embodiments is a smooth, continuous sheet such as aluminum foil.

In certain embodiments the invention may include a method for increasing the yield of carbon foam. The method may comprise loading a mold with particulate coal, where the loaded particulate coal has a top surface, placing a foaming sheet over the top surface of the particulate coal in the loaded mold, and heating the loaded particulate coal to a temperature ranging from about 300° C. to about 500° C. in an inert atmosphere having a pressure ranging from about 50 psi to about 500 psi.

In certain embodiments, the foaming sheet may be in contact with the top surface of the particulate coal. The foaming sheet may comprise a continuous, smooth, solid sheet. Further, more than one foaming sheet may be used to cover the top surface of the particulate coal. Still further, in other embodiments, the foaming sheet has a resultant mass that is not sufficient to cause the foaming sheet to sink into the loaded particulate coal when the loaded particulate turns into a plastic coal mass during heating. The foaming sheet may comprise a metal foil. For example, the foaming sheet may comprise aluminum foil. In some embodiments, the foaming sheet comprises at least one material. In other embodiments, the foaming sheet comprises more than one material. The method may also further comprise the step of covering the mold prior to heating the loaded particulate coal.

Still further, the embodiments of the invention may include a carbon foam produced by loading a mold with particulate coal, where the loaded particulate coal has a top surface, placing a foaming sheet over the top surface of the particulate coal in the loaded mold, and heating the loaded particulate coal to a temperature ranging from about 300° C. to about 500° C. in an inert atmosphere having a pressure ranging from about 50 psi to about 500 psi.

Further, the invention may include a method for producing a carbon foam product, comprising the steps of loading a mold with a carbon precursor, where the loaded carbon precursor has a top surface, placing a foaming sheet over the top surface of the carbon precursor in the loaded mold, and foaming the carbon precursor. The carbon precursor may be particulate coal. Further, the carbon precursor may include an extract of coal, a coal pitch, a petroleum pitch, or a modified coal extract. In certain embodiments, the foaming sheet has at least one section. Further, the foaming sheet may comprise at least one material.

Embodiments of the invention may also include a carbon material comprising a carbon foam body having a top surface and skin carbon adjacent to the top surface. The carbon foam body may have a density ranging from about 0.1 to about 0.8 g/cc.

DESCRIPTION OF EMBODIMENTS OF THE INVENTION

Carbon foams have been produced by a variety of methods. Some of these methods include producing carbon foams directly from particulate coal. For example, U.S. Pat. Nos. 6,749,652 and 6,814,765, each herein incorporated by reference in their entirety, describe methods for producing carbon foam directly from particulate coal. To produce carbon foam from particulate coal, typically, a suitable swelling coal, such as bituminous coal, is heated in an essentially closed vessel. The particulate coal is placed in a mold and is heated in an inert atmosphere under process atmospheric pressures typically greater than ambient and can reach pressures of about 500 psi or greater. The particulate coal is heated to temperatures sufficient to cause the coal to become plastic and swell, forming a carbon foam. In many instances heating the particulate coal to a temperature between about 300° C. and about 500° C. is sufficient to form a carbon foam material. The temperatures and pressure conditions will vary depending upon the characteristics of the particulate coal. The resultant carbon foam may subsequently be heated under an essentially inert, or otherwise non-reactive, atmosphere, to temperatures as great as about 3000° C. Heating of the carbon foam to such elevated temperatures has been found to improve certain properties of the foam. Such properties have included, but are not limited to, electrical resistance and strength.

Figure 1:
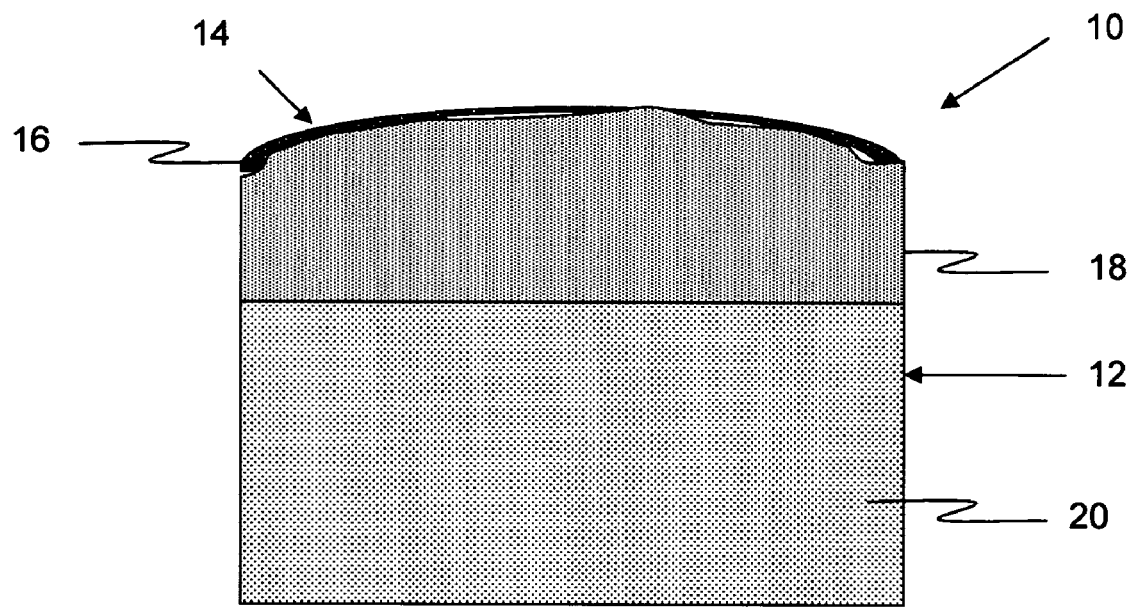
FIG. 1 is a diagrammatic cross-sectional view of a carbon material produced after undergoing foaming procedures.

The produced carbon material takes the shape of the mold. With reference now to FIG. 1 there is shown a diagrammatic cross-sectional view of a typical piece of carbon material 10 produced by foaming particulate coal. The body 12 of the carbon material 10 takes the shape of the mold used during the foaming process. During the foaming process, the volume of the carbon material increases. As the volume increases the top 14 of the carbon material 10 rises and is often curved as depicted in FIG. 1. Further, the carbon material and may contain three different regions of carbon. One of these regions of carbon will be referred to as a skin 16. The skin carbon 16 is a very thin layer (possibly in the range of a few thousands of an inch) of dense carbon typically found on the top and sometimes sides and bottom of the as-produced carbon material. The mass and volume of this skin carbon 16 are very small in relationship to the other two types of carbon. The second type of carbon observed will be referred to as crust carbon 18. The crust 18 is a layer of higher density, possibly non-foamed carbon, which develops between the skin 16 and the carbon foam product 20. This crust carbon 18 is typically about ¼ to ½ inch thick. The amount of crust 18 formed may vary depending upon the characteristics of the particulate coal and the processing conditions. The third type of carbon observed in as-produced carbon material is carbon foam 20. The carbon foam is that foam typically recognized as carbon foam. The carbon foam is porous with relatively uniform pores sizes. The density of the carbon foam often typically ranges from about 0.1 to about 0.8 g/cc. To obtain the carbon foam product 20, the skin 16 and crust 18 materials are removed from the carbon material, leaving the carbon foam product. Typically, the skin and crust may be removed mechanically such as by machining with appropriate cutting equipment.

The carbon foams produced by such methods have been found to have many desirable attributes that give such foams a high degree of utility in a variety of applications. These applications may include thermal barriers, composite tooling forms, and impact shields. Although such production methods result in carbon foams having desirable properties, the yield of carbon foam is reduced by the formation of the skin and crust during the foaming process. Additionally, the carbon foam yield may be reduced by the presence of defects in the material, such as pits, cracks.

The occurrence of this crust has several major negative impacts on the production of the carbon foam. First, the crust is formed from coal that did not adequately form carbon foam, therefore the yield (product mass with respect to feedstock mass) of foam that can be produced from a given amount of coal is reduced. Furthermore, the carbon foam process throughput is partially determined by the amount of coal that can be processed in a given period of time. As part of this coal is consumed by crust formation, the product through-put (product yield with respect to time) is reduced. Additionally, many carbon foam applications require that this crust be removed from the as-produced foam. This removal requires the expenditure of manpower and equipment resources which incurs additional production expense. During this process, some of the carbon foam product is also invariably removed with the crust. These negative process impacts caused by the presence of crust, such as yield losses and increased resource expenditure, entail corresponding negative economic impacts. Thus it is desirable to minimize the effect of crust development.

Figure 2:
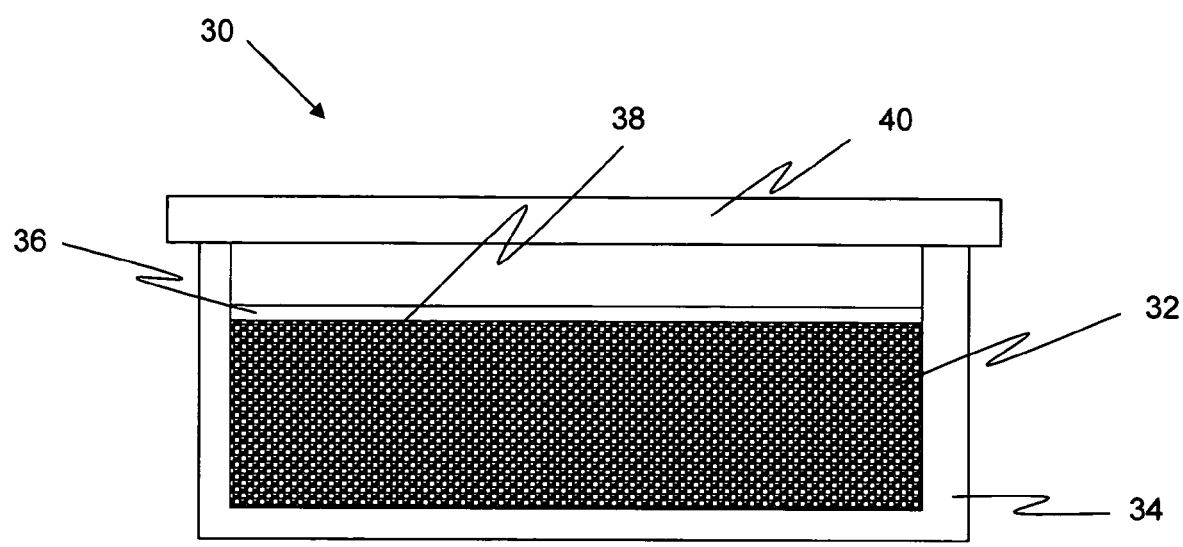
FIG. 2 is a diagrammatic cross-sectional view of a mold filled with particulate carbon feedstock to be foamed in accordance with an embodiment of the invention.

It has been discovered that the crust portion 18 of the carbon material 10 can be substantially reduced, and in some cases virtually eliminated, by uniformly covering the top of the feedstock coal with a cover sheet, also referred to herein as a foaming sheet, prior to and during carbon foam formation. Additionally, the use of a cover sheet or foaming sheet may substantially reduce the size and number of defects which may occur in the material. With reference now to FIG. 2, there is shown a mold configuration 30 prior to foaming. Particulate coal 32 is placed in a mold 34. A foaming sheet 36 is placed on the top surface 38 of the particulate coal 32. A lid 40 may be placed over the mold 34. The foaming sheet stays on the surface during the carbon foam forming process and enhances the ability of the coal particles to produce carbon foam. In certain embodiments, the foaming sheet is comprised of substantially continuous, solid materials. In other embodiments, the foaming sheet may be comprised of discontinuous solid materials. For example, the foaming sheet may include two or more layers of materials. Alternatively, the foaming sheet may comprise totally or partially overlapping sheets. Depending on the size of the mold and amount of material to be foamed, the foaming sheet may include one or more sections where one or more foaming sheets are located adjacent to one another. Further, the foaming sheet may include one or more perforations; however, the number and size of the perforations should not be so great that crust formation becomes significant in the resulting carbon material. Additionally, the size and number of perforations should not provide for a significant amount of coal or coal derived material to be transported through the perforations during the process.

The particulate coal 32 should be covered such that the top surface 38 of the particulate coal 32 is touching the foaming sheet 36. Alternatively, the foaming sheet may be positioned above the particulate coal such that upon partial foaming of the particulate coal, contact is made with the foaming sheet. The distance between the top of the particulate coal and the position of the foaming sheet should not be so great that crust formation becomes significant. In certain embodiments, the foaming sheet covers as much of the particulate coal as possible. Alternatively, not all the top surface of the particulate coal need be covered; however, to obtain a consistent carbon foam throughout the carbon material, it is preferable that as much of the top surface be covered as possible. In certain embodiments, where only a portion of the top surface is covered, the portion of carbon material produced under the foaming sheet will generally benefit from reduced crust formation and increased carbon foam yield. The foaming sheet may include materials that are continuous and substantially solid, including, but not limited to, metal foils such as aluminum foil.

Figure 3:
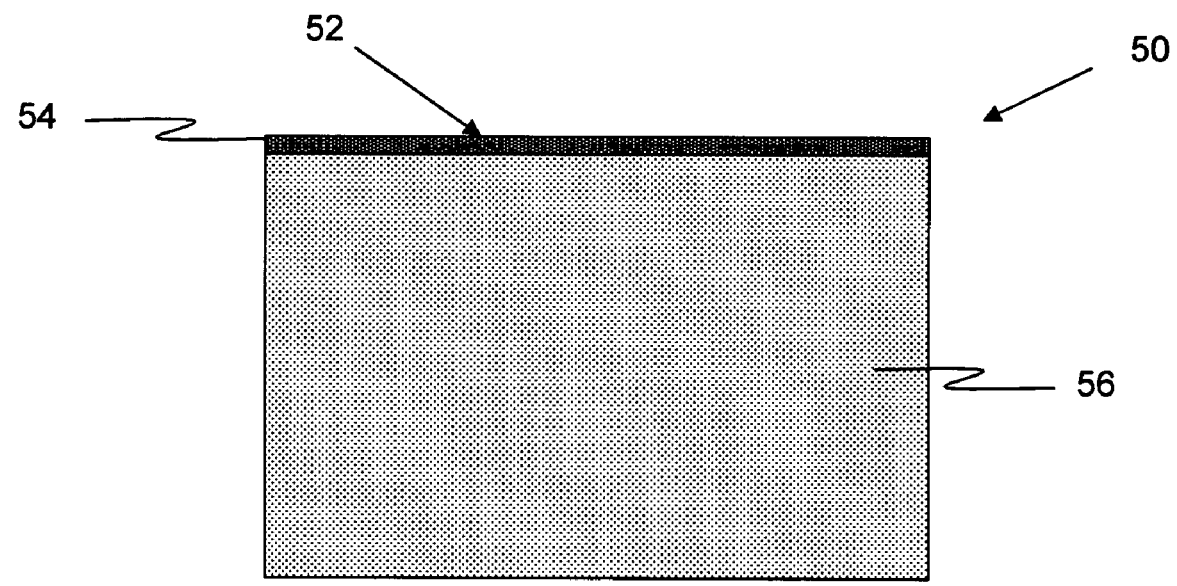
FIG. 3 is a diagrammatic cross-sectional view of a carbon material produced in accordance with an embodiment of the invention.

With reference now to FIG. 3, there is shown a diagrammatic cross-section of carbon material 50 that was prepared using a foaming sheet that uniformly covered the top of the particulate coal prior to and during the foaming process. This carbon material was prepared under similar processing condition as the carbon material shown in FIG. 1, except that a foaming sheet (in this example, aluminum foil) uniformly covered the top surface of the particulate coal during foaming. As illustrated in FIG. 3, the top 52 of the carbon material 50 is relatively flat. There may be a skin 54 material near the top 52 of the carbon material 50. Below the skin 54 is carbon foam 56. A comparison of the carbon material formed in FIG. 1 to the carbon material formed in FIG. 3 shows that the use of the foaming sheet resulted in the substantial reduction, essentially an elimination, of crust region and increased amount of produced carbon foam. The substantial reduction of the crust region reduces the amount of post-processing required to obtain the carbon foam material. Additionally, the use of the foaming sheet resulted in an increase in the relative amount of carbon foam. The reduction in crust formation and increase in the amount of carbon foam in the resultant carbon material makes the production of carbon foam more economically feasible.

In additional to using aluminum foil as the foaming sheet, other sheet materials having at least one face with a smooth solid surface may be contacted with the foaming feedstock coal to inhibit crust formation. Suitable foaming sheet materials should be capable of tolerating the temperatures and pressures associated with the coal foaming process. Additionally, the foaming sheet materials should be essentially non-reactive with the feed-stock coal or any products thereof. Furthermore, it is desirous that the smooth surface of the foaming sheet material should not be significantly wetted by the foaming feedstock coal. Preferably, the smooth surface of the foaming sheet material should not significantly absorb or adsorb the foaming feedstock coal. Suitable foaming sheet materials may include metal foils and sheets, non-porous or glazed ceramic plates or sheets, and the like. Other embodiments may include graphite foils or sheets that satisfy the above discussed criteria as the foaming sheets. It is generally preferable that the smooth surface of the foaming sheet which contacts the foaming feedstock coal be substantially free from dirt, dust, debris, coal residues, and other contaminates prior to use.

The thickness of these foaming sheet materials should be such that the resultant mass of the solid material is not sufficient to cause the solid material to sink within the plastic coal mass during foam formation or cause a deformation of the resultant carbon foam cell structure. Conversely, the thickness of these continuous smooth solid materials should be such that the resultant mass of said solid material is sufficient to provide uniform contact of the solid material with the plastic coal. Different materials may be used in combination to provide a foaming sheet, e.g., more than one solid material may comprise a foaming sheet. For example, a thin sheet of aluminum foil may be placed in contact with the top of the feedstock coal. A sheet of another material may then be placed on top of the aluminum foil to provide sufficient mass to ensure good contact between the foaming coal and the aluminum foil. In certain embodiments, the foaming sheet should not be significantly thermally insulating. Additionally, the outer surface of the smooth solid materials may be coated or otherwise modified to inhibit corrosion, wetting by the plastic coal, or bonding to the resultant carbon foam. Such modifications can include, but are not limited to, glazing, plating, coatings, polishing, and the like.

It has also been found that uniformly covering the top of the feedstock coal with a foaming sheet prior to and during foam formation may have other beneficial impacts on the as-produced foam. For example, in some instances product foams produced using solid material coverings have greater mechanical strengths than do those foams produced without the use of a foaming sheet. Additionally, it has been shown that the use of such foaming sheets may result in smoother, less-cracked, as-produced carbon foam top surfaces. In some embodiments, the use of such coverings may result in the production of a more uniform carbon foam product. Such uniformity may include an increase in the isotropic nature and properties of the carbon foam body. Accordingly, the resulting more uniform products may have reduced internal stresses and therefore may show increased resistance to thermal and mechanical stresses.

In addition to particulate coal feedstocks, a foaming sheet may be used in the processing of other feedstocks into carbon foam. Carbon foam forming feedstocks, also referred to as carbon precursors, may include, but are not limited to, particulate coals, pitches, coal extracts, modified coal extracts, and combinations thereof. Use of a foaming sheet in carbon foam processes utilizing such feedstocks may provide for carbon foams having improved properties as described above.

Although not wishing to be bound to any theory, it is currently believed that the crust exhibited by as-produced carbon foam is the result of the collapse of cell-forming bubbles within the plastic coal at the foam surface. This collapse results in the localized densification of the foam upper surface. The use of a foaming sheet may serve to support the development and growth of bubbles at the upper foam surface. In this manner, the foaming sheet inhibits crust formation and may enable the production of a more uniform carbon foam product. In addition, the use of a metal foil or sheet, for example, aluminum foil, on the bottom and/or side surfaces of the mold in contact with the carbon foam forming feedstock may provide for a reduction in defects and an improvement in yield of the resulting carbon foam product.

As the invention has been described, it will be apparent to those skilled in the art that the invention may be varied in many ways without departing from the spirit and scope of the invention. Any and all such modifications are intended to be included within the scope of the appended claims. The invention is limited only by the following claims.

What is claimed is:

1. A method for increasing the yield of carbon foam, comprising the steps of:
    loading a mold with particulate coal, wherein the loaded particulate coal has a top surface;
    placing a foaming sheet over the top surface of the particulate coal in the loaded mold; and
    heating the loaded particulate coal to a temperature ranging from about 300° C. to about 500° C. in an inert atmosphere having a pressure ranging from about 50 psi to about 500 psi, thereby increasing the yield of carbon foam.

2. The method of claim 1, wherein the foaming sheet is in contact with the top surface of the particulate coal.

3. The method of claim 1, wherein the foaming sheet comprises a continuous, smooth, solid sheet.

4. The method of claim 1, wherein more than one foaming sheet covers the top surface of the particulate coal.

5. The method of claim 1, wherein the foaming sheet has a resultant mass that is not sufficient to cause the foaming sheet to sink into the loaded particulate coal during heating.

6. The method of claim 1, wherein the foaming sheet comprises a metal foil.

7. The method of claim 1, wherein the foaming sheet comprises aluminum foil.

8. The method of claim 1, wherein the foaming sheet comprises at least one material.

9. The method of claim 1, wherein the foaming sheet comprises more than one material.

10. The method of claim 1, further comprising the step of covering the mold prior to heating the loaded particulate coal.

* * * * *